(12) United States Patent
Bi et al.

(10) Patent No.: US 9,119,114 B2
(45) Date of Patent: Aug. 25, 2015

(54) METHOD AND SYSTEM FOR UPDATING TUNNEL INFORMATION

(75) Inventors: Yifeng Bi, Shenzhen (CN); Guoyan Liu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 114 days.

(21) Appl. No.: 14/007,122

(22) PCT Filed: Feb. 16, 2012

(86) PCT No.: PCT/CN2012/071200
§ 371 (c)(1),
(2), (4) Date: Sep. 24, 2013

(87) PCT Pub. No.: WO2012/129990
PCT Pub. Date: Oct. 4, 2012

(65) Prior Publication Data
US 2014/0010206 A1    Jan. 9, 2014

(30) Foreign Application Priority Data
Mar. 30, 2011    (CN) .......................... 2011 1 0078879

(51) Int. Cl.
*H04W 4/00* (2009.01)
*H04W 36/00* (2009.01)
*H04W 76/04* (2009.01)

(52) U.S. Cl.
CPC ...... *H04W 36/0016* (2013.01); *H04W 36/0033* (2013.01); *H04W 76/041* (2013.01); *H04W 36/0005* (2013.01)

(58) Field of Classification Search
CPC .......... H04W 76/041; H04W 36/0016; H04W 36/0005
USPC ........................... 370/331–334; 455/436–444
See application file for complete search history.

(56) References Cited

U.S. PATENT DOCUMENTS

| 2009/0257402 A1* | 10/2009 | Zhu et al. ..................... 370/331 |
| 2010/0330959 A1 | 12/2010 | Mildh et al. |
| 2011/0111767 A1* | 5/2011 | Livanos ..................... 455/452.2 |

FOREIGN PATENT DOCUMENTS

| CN | 101572951 A | 11/2009 |
| CN | 101868001 A | 10/2010 |
| CN | 101868036 A | 10/2010 |
| CN | 101889458 A | 11/2010 |

OTHER PUBLICATIONS

International Search Report in international application No. PCT/CN2012/071200, mailed on May 24, 2012. (2 pages).
English Translation of the Written Opinion of the International Search Authority in international application No. PCT/CN2012/071200, mailed on May 24, 2012. (5 pages).

* cited by examiner

*Primary Examiner* — Mang Yeung
(74) *Attorney, Agent, or Firm* — Oppedahl Patent Law Firm LLC (57) ABSTRACT

The present disclosure discloses a method and system for updating tunnel information. The method comprises: a target HeNB which a user equipment (UE) is to be handed over notifies a Mobility Management Entity (MME) of the tunnel information through a handover acknowledgement message, a handover notification message or a path converting request message; and the MME notifies a fixed network of the received tunnel information through an Evolved Packet Core (EPC) gateway and a Policy and Charging Rules Function entity (PCRF). With the present disclosure, policy interworking between a mobile network and the fixed network can be implemented, and the Quality of Service of the HeNB can be ensured.

14 Claims, 8 Drawing Sheets

METHOD AND SYSTEM FOR UPDATING TUNNEL INFORMATION

TECHNICAL FIELD

The disclosure relates to technology for convergence of a fixed network and a mobile network in the communication field, and in particular to a method and system for updating tunnel information.

BACKGROUND

Figure 1:
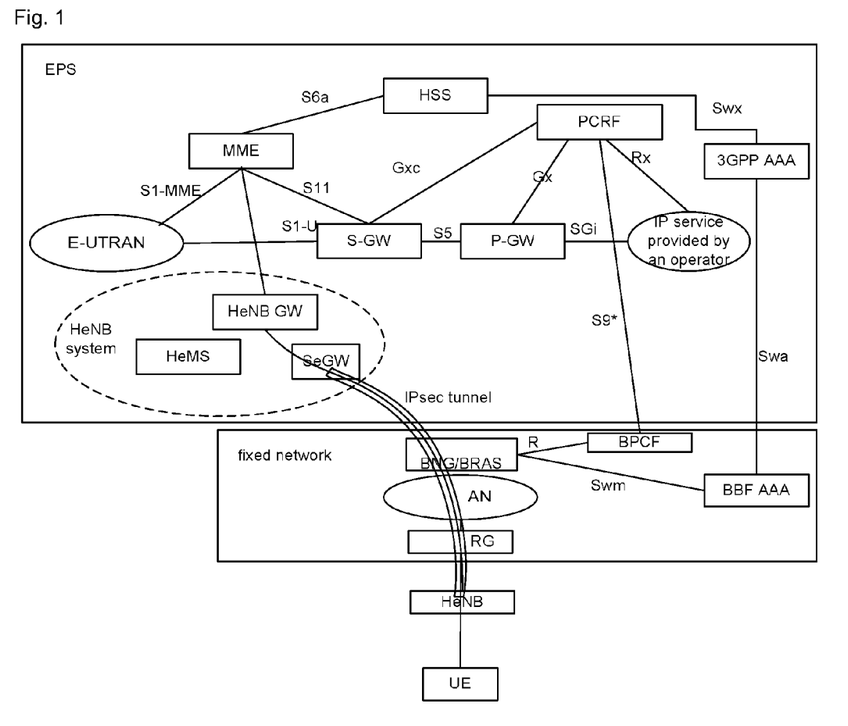
FIG. 1 is the diagram of the architecture of convergence of an EPS, a fixed network and an H(e)NB in the related art.

An Evolved Packet System (EPS) of the 3rd Generation Partnership Project (3GPP) consists of an Evolved Universal Terrestrial Radio Access Network (E-UTRAN), a Mobility Management Entity (MME), a Serving Gateway (S-GW), a Packet Data Network Gateway (P-GW), a Home Subscriber Server (HSS), an Authentication, Authorization and Accounting (AAA) server of the 3GPP, a Policy and Charging Rules Function (PCRF) entity, and other supporting nodes, as shown in the EPS box in FIG. 1, wherein the MME is responsible for work related to a control plane such as mobility management, non-access layer signalling processing, and user-mobility-management-context management; the S-GW is an access gateway device connected with the E-UTRAN, forwards data between the E-UTRAN and the P-GW, and is responsible for buffering the data during the paging phase; and the P-GW is a border gateway of the EPS and a Packet Data Network (PDN), and is responsible for functions such as access of the PDN and data forwarding between the EPS and the PDN; wherein as a network deployment is implemented, the S-GW and the P-GW may be arranged together or separately, and may be referred to as Evolved Packet Core (EPC) gateway or integrated service gateway after being arranged together. The PCRF is a Policy and Charging Rules Function entity connected to an Internet Protocol (IP) service network of an operator through a receiving interface Rx to receive service information; moreover, the PCRF is also connected to a gateway device within the network through a Gx/Gxc interface, and is responsible for initiating establishment of an IP bearer, ensuring Quality of Service (QoS) of service data, and performing charging control.

The EPS supports access of a Home evolved NodeB (HeNB, also referred to as a Home NodeB for short in the disclosure), as shown in FIG. 1. The HeNB is a miniaturized low-power base station, which is deployed at indoor locations such as a house, an office, a business building and so on. The HeNB generally accesses a core network of the EPS via a rented fixed network line. In order to guarantee secure access, a Security Gateway (SeGW) is introduced in the core network to perform shielding, and data between the HeNB and the SeGW will be encapsulated with IP Security (IPSec). The HeNB may be directly connected to the MME and the S-GW of the core network via an IPSec tunnel established with the SeGW, or may be connected to the MME and the S-GW via an HeNB GW, i.e., the HeNB GW is an optional network element (NE). At the same time, in order to manage the HeNB, an NE Home eNodeB Management System (HeMS) is introduced. Moreover, a Universal Mobile Telecommunications System (UMTS) supports access of the Home NodeB (HNB). The related technology is similar to that of the HeNB.

The QoS of the fixed network line for access of the H(e)NB (i.e., a blanket term for the HeNB and the HNB) is generally restricted by a contract between an H(e)NB owner and a fixed network operator, therefore when a 3GPP user equipment (UE) accesses the 3GPP core network to access a service through the H(e)NB, the required QoS cannot exceed the contracted QoS of the fixed network line that can be provided by the fixed network operator. Otherwise, the QoS of the service accessed by the UE, in particular a Guaranteed Bitrate (GBR) service, will not be guaranteed. Therefore, for a 3GPP network and the fixed network, a unified control and management mechanism is required to implement admission control of user/connection/service. The solution currently accepted preliminarily by the Organization for Standardization is as shown in FIG. 1 (the case of HeNB). A PCRF, i.e., Policy Control and Charging (PCC) NE of the 3GPP system, is connected to a Broadband Policy Control Function (BPCF) entity of the fixed network via an interface S9* to implement policy interworking and resource management, thus implementing reasonable control and management of a fixed network resource and ensuring preferentially an resource with a high priority for access via the H(e)NB.

As described above, if the fixed network is required to ensure the QoS for the line for access of the H(e)NB, the fixed network is required to locate the fixed network line where the H(e)NB is currently located (referred to as a backhaul in a technical specification, i.e., a fixed-network backhaul network). In the related art, the fixed network line is located through information such as an outer layer (or local) IP address and port number of the H(e)NB. The information is sent to the PCRF through a flow of User Equipment (UE) attachment from the H(e)NB or of a PDN connection establishment; and the PCRF finds the BPCF in charge of resource control and management of the fixed network line for the H(e)NB, and establishes an S9* session with the BPCF.

Figure 2:
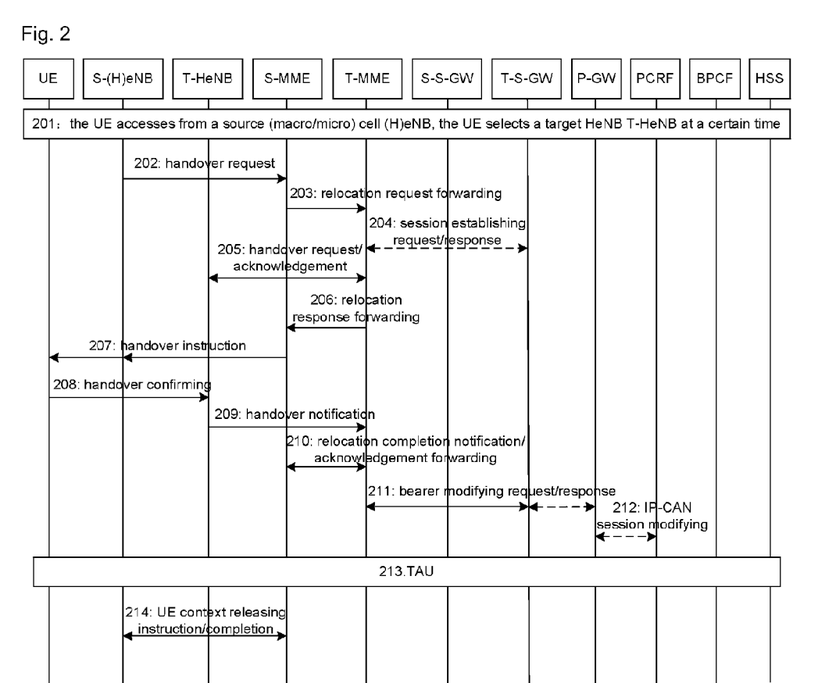
FIG. 2 is a flow chart of an inter-(H)eNB handover of a UE in the related art.

According to the related art, a specific flow of handing the UE from a macro-cell over to a micro-cell, or handing the UE over different micro-cells, as shown in FIG. 2, mainly including the following steps:

Step 201, the UE accesses from a source (H)eNB (macro-cell or micro-cell (H)eNB, S(H)eNB), initiates a handover at a certain time, and selects to access from a target HeNB (T-HeNB).

Step 202, the S(H)eNB sends a handover request message to a source MME (i.e., S-MME).

Step 203, the S-MME sends a target MME (i.e., T-MME) a relocation request forwarding message used for delivering context information to a target side and notifying the target side to perform a handover operation.

Step 204, if S-GW relocation occurs, then the T-MME sends a session establishing request message to a target S-GW (i.e., T-S-GW) and receives a session establishing response message from the T-S-GW; if S-GW relocation doesn't occur, i.e., the S-S-GW and the T-S-GW are the same gateway, then the operation of this step is skipped and is not executed.

Step 205, the T-MME sends a handover request message to the T-HeNB, and receives a handover acknowledgement message returned by the T-HeNB; if S-GW relocation occurs in the previous step 204, then it is also required to establish, in step 205, a user plane data channel between the T-HeNB and the T-S-GW.

Step 206, the T-MME sends the S-MME a relocation response forwarding message as a response to the step 203.

Step 207, the S-MME sends a handover instruction to the source (H)eNB, and the source (H)eNB forwards the handover instruction to the UE to notify it to perform the handover.

Step 208, the UE sends a handover confirming message to the T-HeNB, and the UE hands a radio channel over to the target side.

Step 209, the T-HeNB sends a handover notification message to the T-MME.

Step 210, the T-MME and the S-MME exchange a relocation completion notification/acknowledgement forwarding message.

Step 211, if S-GW relocation occurs, the T-MME sends a bearer modifying request message to the T-S-GW, and as a return, the T-S-GW sends a bearer modifying response message to the T-MME; meanwhile, the triggered T-S-GW sends a bearer modifying request message to the P-GW, and the P-GW also returns a bearer modifying response message to the S-S-GW.

If the S-GW relocation doesn't occur, then the T-S-GW is the S-S-GW; only the T-MME and the S-GW exchange the bearer modifying request/response message, and message interaction between the S-GW and the P-GW will not be performed.

Step 212, if the P-GW receives the bearer modifying request message from the S-GW, then the P-GW and the PCRF intercommunicate in an IP-Connectivity Access Network (IP-CAN) session modifying step to update an IP-CAN session; if the P-GW doesn't receive a triggering message or there is no special information which the PCRF is to be notified of in the bearer modifying message received by the P-GW, then the step is omitted.

Step 213, the UE initiates a Tracking Area Update (TAU) operation after completing the handover, and the user updates the mobility management context of the UE in the MME.

Step 214, the S-MME sends a UE context releasing instruction message to the source (H)eNB to release the context of the user at a source network side.

Now, the handover is completed.

By analyzing the above handover steps, the following defects may be seen: 1) the UE has been handed over between micro-cell (H)eNBs, while what the core network has is the outer layer or local IP address/port number of the S-(H)eNB, which will result in a resource control error; 2) the UE is handed from a source macro-cell over to a micro-cell, while the core network side cannot receive information on the local IP address/port number of the fixed network line where the target HeNB is located which will also lead to failure of policy interworking and resource management. The above defects are all caused by a failure to update tunnel information related to the target HeNB at the core network when the UE is handed over between (H)eNBs; and because the tunnel information related to the target HeNB cannot be updated at the core network when the UE is handed over between (H)eNBs, policy interworking between the mobile network and the fixed network cannot be implemented, nor can the QoS of the HeNB be ensured.

SUMMARY

In view of the above, the main purpose of the present disclosure is to provide a method and system for updating tunnel information to implement policy interworking of a mobile network and a fixed network, and ensure the QoS of an HeNB.

For the above purpose, the technical solution of the present disclosure is implemented as follows.

The present disclosure provides a method for updating tunnel information, including:

notifying, by a target Home evolved NodeB (HeNB) to which a user equipment (UE) is to be handed over, a Mobility Management Entity (MME) of the tunnel information through a handover acknowledgement message, a handover notification message, or a path converting request message; and notifying, by the MME, a fixed network of the received tunnel information through an Evolved Packet Core (EPC) gateway and a Policy and Charging Rules Function entity (PCRF).

The notifying, by the MME, a fixed network of the received tunnel information through an EPC gateway and a PCRF may specifically be:

notifying, by the MME, a Serving Gateway (S-GW) of the received tunnel information through a session establishing, modifying or updating request message or a bearer modifying request message;

notifying, by the S-GW, a Packet Data Network Gateway (P-GW) of the received tunnel information through a session establishing, modifying or updating request message, a bearer modifying request message, or a Proxy Binding Update (PBU) message; and notifying, by the P-GW, the PCRF of the received tunnel information through an IP Connectivity Access Network (IP-CAN) session modifying message; and notifying, by the PCRF, a Broadband Policy Control Function entity (BPCF) of the fixed network of the received tunnel information through an S9* session establishing or modifying operation.

The notifying, by the MME, a fixed network of the received tunnel information through an EPC gateway and a PCRF may specifically be:

notifying, by the MME, a Serving Gateway (S-GW) of the received tunnel information through a session establishing, modifying or updating request message or a bearer modifying request message; and notifying, by the S-GW, the PCRF of the received tunnel information through a gateway control session modifying message; and notifying, by the PCRF, a Broadband Policy Control Function entity (BPCF) of the fixed network of the received tunnel information through an S9* session establishing or modifying operation.

The method may further include:

when the handover is in an S1 mode, notifying, by the target HeNB, the MME of the tunnel information through the handover acknowledgement message or the handover notification message; or when the handover is in an X2 mode, notifying, by the target HeNB, the MME of the tunnel information through the path converting request message.

Notifying, by the PCRF, a BPCF of the fixed network of the received tunnel information through an S9* session establishing or modifying operation may specifically be:

when there is no S9* session between the PCRF and a BPCF before the handover, selecting, by the PCRF, a BPCF according to the received tunnel information, initiating, by the PCRF, an S9* session establishing operation, and sending, by the PCRF, the tunnel information to the selected BPCF; or when there exists an S9* session between the PCRF and a BPCF before the handover, then verifying, by the PCRF, whether the BPCF having the S9* session between itself and the PCRF is the one indicated by the tunnel information: if so, initiating, by the PCRF, an S9* session modifying operation, and sending, by the PCRF, the tunnel information to the BPCF; otherwise re-selecting, by the PCRF, a BPCF according to the tunnel information, initiating, by the PCRF, the S9* session establishing operation, and sending, by the PCRF, the tunnel information to the re-selected BPCF.

The tunnel information may be an outer layer IP address of the target HeNB.

The tunnel information may further include one kind or several kinds of the following information:
a Fully Qualified Domain Name (FQDN) of a BPCF;
an outer layer port number of the target HeNB;
an address and/or port number of a Security Gateway (SeGW) of an IP Security (IPsec) tunnel;
an identity of the target HeNB; and
an Identity (VLAN ID) of a Virtual Local Area Network where the target HeNB is located.

The present disclosure further provides a method for updating tunnel information, including:
notifying, by a target Home evolved NodeB (HeNB) to which a user equipment (UE) is to be handed over, a Mobility Management Entity (MME) of the tunnel information through a handover acknowledgement message, a handover notification message, or a path converting request message;
notifying, by the MME, a Packet Data Network Gateway (P-GW) of the received tunnel information through a change notification message;
notifying, by the P-GW, a Policy and Charging Rules Function entity (PCRF) of the received tunnel information through an IP Connectivity Access Network (IP-CAN) session modifying message; and
notifying, by the PCRF, a Broadband Policy Control Function entity (BPCF) of a fixed network of the received tunnel information through an S9* session establishing or modifying operation.

The tunnel information may be an outer layer IP address of the target HeNB.

The tunnel information may further include one kind or several kinds of the following information:
a Fully Qualified Domain Name (FQDN) of the BPCF;
an outer layer port number of the target HeNB;
an address and/or port number of a Security Gateway (SeGW) of an IP Security (IPsec) tunnel;
an identity of the target HeNB; and
an Identity (VLAN ID) of a Virtual Local Area Network where the target HeNB is located.

The present disclosure further provides a system for updating tunnel information, including: a target Home evolved NodeB (HeNB) to which a user equipment (UE) is to be handed over, a Mobility Management Entity (MME), an Evolved Packet Core (EPC) gateway, and a Policy and Charging Rules Function entity (PCRF), wherein
the target HeNB is configured to notify the MME of the tunnel information through a handover acknowledgement message, a handover notification message, or a path converting request message;
the MME is configured to notify a fixed network of the received tunnel information through the EPC gateway and the PCRF; and
the EPC gateway and the PCRF are configured to implement forwarding of the tunnel information from the MME to the fixed network.

The EPC gateway may include a Serving Gateway (S-GW) and a Packet Data Network Gateway (P-GW), wherein
the MME is further configured to notify the S-GW of the received tunnel information through a session establishing, modifying or updating request message or a bearer modifying request message;
the S-GW is configured to notify the P-GW of the received tunnel information through a session establishing, modifying or updating request message, a bearer modifying request message, or a Proxy Binding Update (PBU) message;
the P-GW is configured to notify the PCRF of the received tunnel information through an IP Connectivity Access Network (IP-CAN) session modifying message; and
the PCRF is configured to notify a Broadband Policy Control Function entity (BPCF) of the fixed network of the received tunnel information through an S9* session establishing or modifying operation.

The EPC gateway may include a Serving Gateway (S-GW), wherein
the MME is further configured to notify the S-GW of the received tunnel information through the session establishing, modifying or updating request message or a bearer modifying request message;
the S-GW is configured to notify the PCRF of the received tunnel information through a gateway control session modifying message; and
the PCRF is configured to notify a Broadband Policy Control Function entity (BPCF) of the fixed network of the received tunnel information through an S9* session establishing or modifying operation.

The target HeNB may be further configured to:
notify the MME of the tunnel information through the handover acknowledgement message or the handover notification message when the handover is in an S1 mode; or
notify the MME of the tunnel information through the path converting request message when the handover is in an X2 mode.

The PCRF may be further configured as follows:
when there is no S9* session between the PCRF and a BPCF before the handover, the PCRF may select a BPCF according to the received tunnel information, initiate an S9* session establishing operation, and send the tunnel information to the selected BPCF; and
when there exists an S9* session between the PCRF and a BPCF before the handover, the PCRF may verify whether the BPCF having the S9* session between itself and the PCRF is the one indicated by the tunnel information: if so, the PCRF may initiate an S9* session modifying operation and send the tunnel information to the BPCF; otherwise the PCRF may re-select a BPCF according to the tunnel information, initiate the S9* session establishing operation, and send the tunnel information to the re-selected BPCF.

The tunnel information may be an outer layer IP address of the target HeNB.

The tunnel information may further include one kind or several kinds of the following information:
a Fully Qualified Domain Name (FQDN) of a BPCF;
an outer layer port number of the target HeNB;
an address and/or port number of a Security Gateway (SeGW) of an IP Security (IPsec) tunnel;
an identity of the target HeNB; and
an Identity (VLAN ID) of a Virtual Local Area Network where the target HeNB is located.

The present disclosure further provides a system for updating tunnel information, including: a target Home evolved NodeB (HeNB) to which a user equipment (UE) is to be handed over, a Mobility Management Entity (MME), a Packet Data Network Gateway (P-GW), a Policy and Charging Rules Function entity (PCRF), and a Broadband Policy Control Function entity (BPCF) of a fixed network, wherein
the target HeNB is configured to notify the MME of the tunnel information through a handover acknowledgement message, a handover notification message, or a path converting request message;
the MME is configured to notify the P-GW of the received tunnel information through a change notification message;
the P-GW is configured to notify the PCRF of the received tunnel information through an IP Connectivity Access Network (IP-CAN) session modifying message;

the PCRF is configured to notify the BPCF of the fixed network of the received tunnel information through an S9* session establishing or modifying operation; and the BPCF is configured to receive the tunnel information notified by the PCRF.

The tunnel information may be an outer layer IP address of the target HeNB.

The tunnel information may further include one kind or several kinds of the following information:

a Fully Qualified Domain Name (FQDN) of the BPCF;
an outer layer port number of the target HeNB;
an address and/or port number of a Security Gateway (SeGW) of an IP Security (IPsec) tunnel;
an identity of the target HeNB; and
an Identity (VLAN ID) of a Virtual Local Area Network where the target HeNB is located.

With the method and system for updating tunnel information provided by the present disclosure, when a UE is handed over inter-(H)eNBs, the target HeNB updates its related tunnel information to the core network, when the UE is handed over micro-cell (H)eNBs, the core network can receive the tunnel information of the target HeNB so as to implement resource control; when the UE is handed from a macro-cell over to a micro-cell, the core network can receive information on the local IP address/port number of the fixed network line where the target HeNB is located so as to implement policy interworking and resource management of the mobile network and the fixed network; with the present disclosure, the QoS of the HeNB is ensured.

DETAILED DESCRIPTION

The technical solution of the present disclosure will be further elaborated with reference to the accompanying drawings and specific embodiments.

The tunnel information in the embodiments of the present disclosure is introduced first. In the related art, when a Home evolved NodeB (HeNB) accesses an EPC, an IPsec tunnel is established between the HeNB and an SeGW, as shown in FIG. 1, wherein the HeNB and the SeGW are two endpoints of the IPsec tunnel, respectively. The tunnel information in the embodiments of the present disclosure is an outer layer IP address of the HeNB (also called a local IP address of the HeNB) as one of the endpoints of the IPsec tunnel, and in addition, the tunnel information may also include one kind or several kinds of the following information:

a Fully Qualified Domain Name (FQDN) of a BPCF;
an outer layer port number of the HeNB (also referred to as a local port number of the HeNB);
an address and/or port number of the SeGW as one of the endpoints of the IPsec tunnel;
an identity of the HeNB, for example, International Mobile Station Identity (IMSI); and
an Identity (VLAN ID) of a Virtual Local Area Network where the HeNB is located.

Wherein, the outer layer/local IP address of the HeNB is allocated by a fixed network/WLAN access network; if there is a Network Address Translation (NAT) in the WLAN, then the outer layer/local IP address of the HeNB is a public network IP address and a User Datagram Protocol (UDP) port number translated by a NAT translator served as by a Residential Gateway (RG).

Information on the fixed network such as the local/outer layer IP address (and port number) of the HeNB is included in the tunnel information, and as the tunnel information is provided by the WLAN access network/fixed network, a PCRF can select a BPCF (a network element (NE) of the fixed network/WLAN access network) serves the line where the address is located according to the address; in addition, the WLAN access network/fixed network may locate the fixed network line where the HeNB is located according to the tunnel information, and can ensure QoS on the line according to a policy rule.

If the HeNB doesn't pass through an RG serving as a router when accessing the fixed network/WLAN access network or the RG operates in a bridging mode, then the IP address received by the accessing HeNB can be uniquely identified and located by the fixed network/WLAN access network, and the fixed network line where the HeNB is located can be located according to the address; the address is allocated to the HeNB by a related NE (for example, a Broadband Network Gateway/Broadband Remote Access Server (BNG/BRAS)) when the HeNB accesses the fixed network/WLAN access network, and the address is the local/outer layer IP address.

If the HeNB passes through the RG serving as a router when accessing the fixed network/WLAN access network, then the IP address received by the accessing HeNB is a private IP address allocated by the RG and cannot be part of the tunnel information. In this case, when the HeNB establishes the IPsec tunnel with the SeGW, the SeGW feeds back to the HeNB the UDP port number and the outer layer/local IP address going through the NAT by the RG; the HeNB constructs the tunnel information using the address; the fixed network line where the HeNB is located can be located according to the address. In addition to the local/outer layer IP address (and port number), the tunnel information may also include information such as the FQDN of the BPCF.

The method for updating tunnel information of the present disclosure will be elaborated with specific embodiments.

Figure 3:
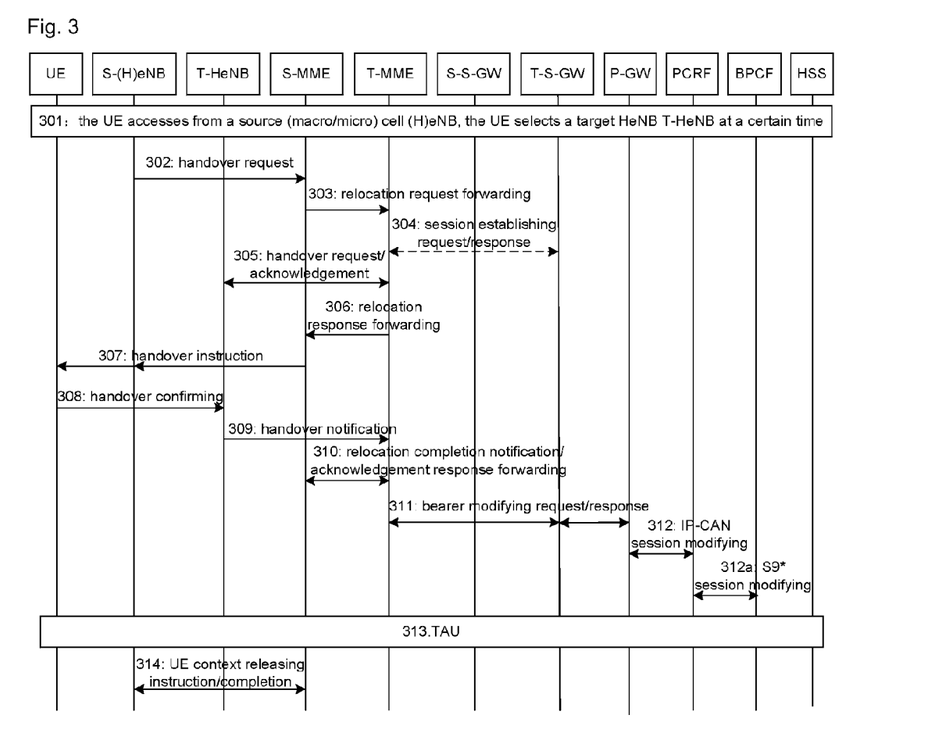
FIG. 3 is a flow chart of a method for updating tunnel information in a first embodiment of the present disclosure.

The first embodiment of the present disclosure is as shown in FIG. 3, wherein the flow of handing a UE from a macro-cell over to a micro-cell, or handing the UE over different micro-cells (based on a handover scenario in an S1 interface) mainly includes the following steps:

Step 301, the UE accesses from a source (H)eNB (macro-cell or micro-cell (H)eNB, S-(H)eNB), initiates a handover at a certain time, and selects to access from a target HeNB (T-HeNB).

Step 302, the S-(H)eNB sends a handover request message to a source MME (i.e., S-MME).

Step 303, the S-MME sends a target MME (i.e., T-MME) a relocation request forwarding message used for delivering context information to a target side and notifying the target side to perform a handover operation.

Step 304, if S-GW relocation occurs, then the T-MME sends a session establishing request message to a target S-GW (i.e., T-S-GW) and receives a session establishing response message from the T-S-GW; if S-GW relocation doesn't occur, i.e., the S-S-GW and the T-S-GW are the same gateway, then the operation of this step is skipped and is not executed.

Step 305, the T-MME sends a handover request message to the T-HeNB, and receives a handover acknowledgement message returned by the T-HeNB; if S-GW relocation occurs in the previous step 304, then it is also required to establish, in step 305, a user plane data channel between the T-HeNB and the T-S-GW.

Step 306, the T-MME sends the S-MME a relocation response forwarding message as a response to the step 303.

Step 307, the S-MME sends a handover instruction to the source (H)eNB, and the source (H)eNB forwards the handover instruction to the UE to notify it to perform the handover.

Step 308, the UE sends a handover confirming message to the T-HeNB, and the UE hands a radio channel over to the target side.

Step 309, the T-HeNB sends the T-MME a handover notification message in which the T-HeNB carries the tunnel information to the T-MME.

Step 310, the T-MME and the S-MME exchange a relocation completion notification/acknowledgement forwarding message.

Step 311, regardless of whether S-GW relocation occurs or not, the T-MME sends a bearer modifying request message to the T-S-GW, and as a return, the T-S-GW sends a bearer modifying response message to the T-MME; meanwhile, the triggered T-S-GW sends a bearer modifying request message to the P-GW, and the P-GW also returns a bearer modifying response message to the S-S-GW.

In the bearer modifying request message, the T-MME sends the tunnel information to the S-GW, which then sends the tunnel information to the P-GW.

Step 312, the P-GW receives the bearer modifying request message from the S-GW, intercommunicates in an IP-CAN session modifying step with the PCRF to update an IP-CAN session, and sends the tunnel information to the PCRF.

Step 312a, the PCRF initiates an S9* session establishing/updating operation after receiving the tunnel information; specifically:

when there is no S9* session between the PCRF and the BPCF before a handover, then the PCRF selects the BPCF according to the received tunnel information, initiates the S9* session establishing operation, and sends the tunnel information to the selected BPCF; and when there exists an S9* session between the PCRF and the BPCF before the handover, then the PCRF verifies whether the BPCF having the S9* session between itself and the PCRF is the one indicated by the tunnel information: if so, the PCRF initiates the S9* session modifying operation and sends the tunnel information to the BPCF; otherwise the PCRF re-selects a BPCF according to the tunnel information, initiates the S9* session establishing operation, and sends the tunnel information to the re-selected BPCF.

Step 313, the UE initiates a TAU operation after completing the handover, and the user updates the mobility management context of the UE in the MME.

Step 314, the S-MME sends a UE context releasing instruction message to the source (H)eNB to release the context of the user at a source network side.

Now, the handover is completed.

It should be noted that in the above operation steps of the embodiment, the T-HeNB notifies the T-MME of the tunnel information through the handover notification message of the step 309; alternatively, as another implementation of the present disclosure, the tunnel information may also be carried to the T-MME through the handover acknowledgement message of the step 305, and other subsequent delivery paths are the same as the above steps of the embodiment.

Figure 4:
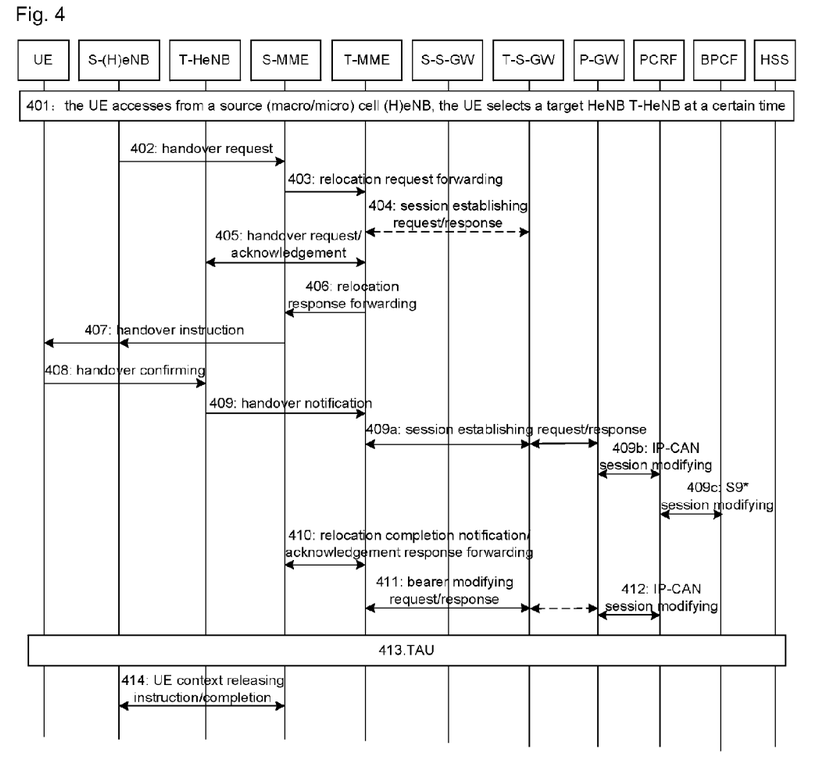
FIG. 4 is a flow chart of a method for updating tunnel information in a second embodiment of the present disclosure.

The second embodiment of the present disclosure is as shown in FIG. 4, wherein the flow of handing a UE from a macro-cell over to a micro-cell, or handing the UE over different micro-cells (based on a handover scenario in an S1 interface) mainly includes the following steps:

Steps 401-409, are the same as the steps 301-309 in the first embodiment.

Step 409a, after receiving the tunnel information sent by T-HeNB through step 405 or 409, T-MME resends a session establishing, modifying or updating request message to T-S-GW and carries tunnel information to T-S-GW; similarly, the T-S-GW carries the tunnel information to P-GW through the session establishing, modifying or updating request message.

Successively, the P-GW returns a response message to the T-S-GW, and the T-S-GW returns a response message to the T-MME.

Step 409b, after receiving the tunnel information from the S-GW, the P-GW intercommunicates in an IP-CAN session modifying step with the PCRF to update an IP-CAN session, and sends the tunnel information to the PCRF.

Step 409c, the PCRF initiates an S9* session establishing/updating operation after receiving the tunnel information; specifically:

when there is no S9* session between the PCRF and BPCF before a handover, then the PCRF selects the BPCF according to the received tunnel information, initiates the S9* session establishing operation, and sends the tunnel information to the selected BPCF; and when there exists an S9* session between the PCRF and the BPCF before the handover, then the PCRF verifies whether the BPCF having the S9* session between itself and the PCRF is the one indicated by the tunnel information: if so, the PCRF initiates the S9* session modifying operation and sends the tunnel information to the BPCF; otherwise the PCRF re-selects a BPCF according to the tunnel information, initiates the S9* session establishing operation, and sends the tunnel information to the re-selected BPCF.

The operations of steps 410-414 are the same as that of steps 210-214 and will not be repeated here.

Figure 5:
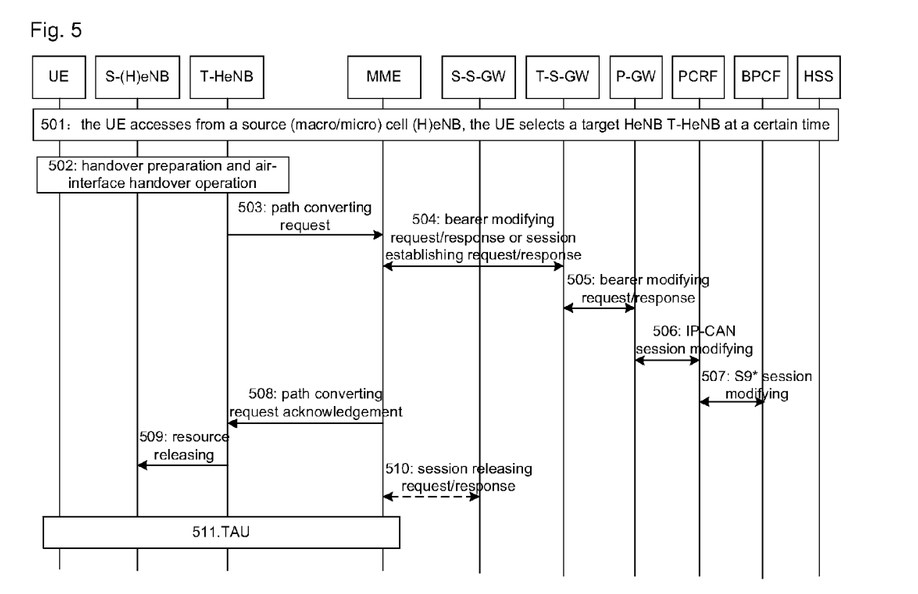
FIG. 5 is a flow chart of a method for updating tunnel information in a third embodiment of the present disclosure.

The third embodiment of the present disclosure is as shown in FIG. 5 and is based on a handover scenario in an X2 interface, wherein a signalling bearing the tunnel information is different from that of the first and second embodiments, and the embodiment mainly includes the following steps:

Step 501, a UE accesses from a source (H)eNB (macro-cell or micro-cell (H)eNB, S-(H)eNB), initiates a handover at a certain time, and selects to access from a target HeNB (T-HeNB).

Step 502, preparation before the handover and an air-interface handover operation are of the related art and will not be repeated here.

Step 503, the T-HeNB sends a path converting request message to an MME, and sends tunnel information of the T-HeNB to the MME through the message.

Step 504, if S-GW relocation occurs during the handover, then the MME sends the tunnel information to a T-S-GW through a session establishing request message; and after receiving the session establishing request message, the T-S-GW sends a session establishing response message to the MME; if S-GW relocation doesn't occur during the handover, then the T-S-GW is S-S-GW, and the MME sends a bearer modifying request message including the received tunnel information to the S-GW; and after receiving the bearer modifying request message, the S-GW sends a bearer modifying response message to the MME.

Step 505, the S-GW exchanges a bearer modifying request/response message with P-GW, and sends the tunnel information to the P-GW.

Step 506, the P-GW receives the bearer modifying request message from the S-GW, intercommunicates in an IP-CAN session modifying step with a PCRF to update an IP-CAN session, and sends the tunnel information to the PCRF.

Step 507, the PCRF initiates an S9* session establishing/updating operation after receiving the tunnel information; specifically:

when there is no S9* session between the PCRF and a BPCF before the handover, then the PCRF selects the BPCF according to the received tunnel information, initiates the S9* session establishing operation, and sends the tunnel information to the selected BPCF; and when there exists an S9* session between the PCRF and the BPCF before the handover, then the PCRF verifies whether the BPCF having the S9* session between itself and the PCRF is the one indicated by the tunnel information: if so, the PCRF initiates the S9* session modifying operation and sends the tunnel information to the BPCF; otherwise the PCRF re-selects a BPCF according to the tunnel information, initiates the S9* session establishing operation, and sends the tunnel information to the re-selected BPCF.

Step 508, the MME returns a path converting request acknowledgement message to the T-HeNB to notify the T-HeNB of the completion of the handover.

Step 509, the T-HeNB sends a resource releasing message to the source (H)eNB to release a resource at a source network side.

Step 510, if S-GW relocation occurs, then a session between the MME and the S-S-GW will be released; if S-GW relocation doesn't occur, then this step is skipped.

Step 511, the UE initiates a TAU operation after completing the handover, and the user updates the mobility management context of the UE in the MME.

Now, the handover is completed.

Figure 6:
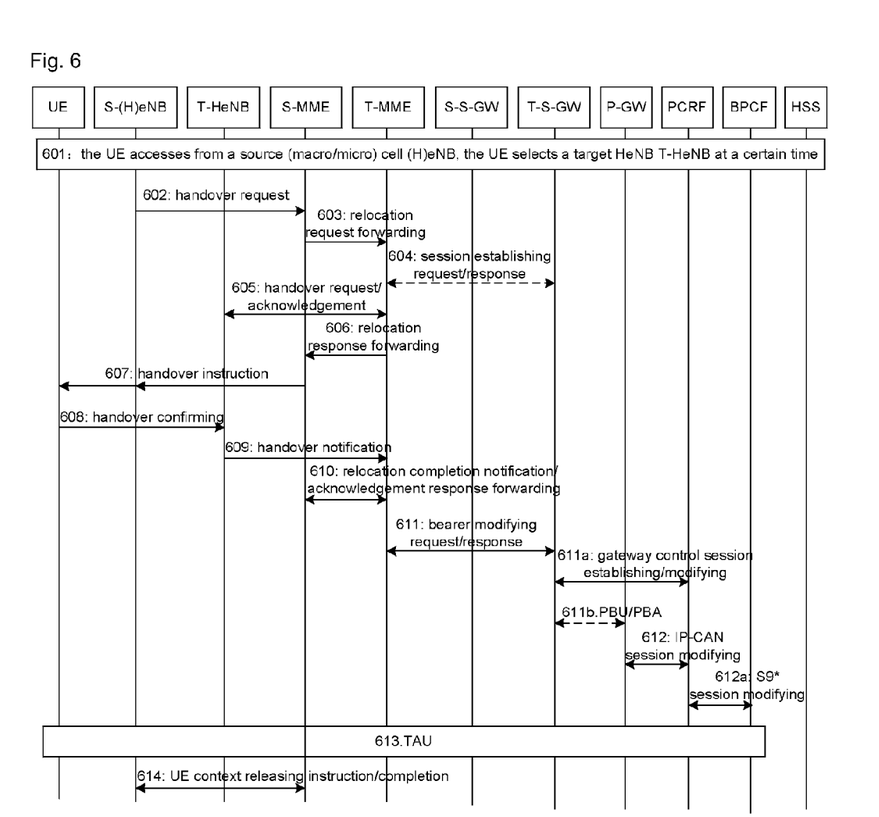
FIG. 6 is a flow chart of a method for updating tunnel information in a fourth embodiment of the present disclosure.

The fourth embodiment of the present disclosure is as shown in FIG. 6, and the mechanism of the embodiment is similar to that of the first embodiment except that instead of a GTP (General Packet Radio Service (GPRS) Tunnelling Protocol), a Proxy Mobile IP (PMIP) protocol is adopted between S-GW and P-GW, therefore tunnel information is not delivered from the S-GW to the P-GW and then to the PCRF, but is reported to PCRF by the S-GW through a gateway control session, and then reported to BPCF by the PCRF. The following steps are included specifically:

Steps 601-611, are the same as steps 301-311 in the first embodiment.

Step 611a, T-S-GW initiates a gateway control session establishing/modifying operation with PCRF, and sends tunnel information to the PCRF.

Step 611b, if S-GW relocation occurs, then binding of S-GW and P-GW is implemented through a PMIP Proxy Binding Update (PBU)/Proxy Binding Acknowledgement (PBA) message; if S-GW relocation doesn't occur, then this step is skipped.

Step 612, the P-GW updates an IP-CAN session with the PCRF.

Step 612a, the PCRF initiates an S9* session establishing/updating operation after receiving the tunnel information; specifically:

when there is no S9* session between the PCRF and the BPCF before the handover, then the PCRF selects the BPCF according to the received tunnel information, initiates the S9* session establishing operation, and sends the tunnel information to the selected BPCF; and when there exists an S9* session between the PCRF and the BPCF before the handover, then the PCRF verifies whether the BPCF having the S9* session between itself and the PCRF is the one indicated by the tunnel information: if so, the PCRF initiates the S9* session modifying operation and sends the tunnel information to the BPCF; otherwise the PCRF re-selects a BPCF according to the tunnel information, initiates the S9* session establishing operation, and sends the tunnel information to the re-selected BPCF.

Step 613, the UE initiates a TAU operation after completing the handover, and the user updates the mobility management context of the UE in the MME.

Step 614, the S-MME sends a UE context releasing instruction message to the source (H)eNB to release the context of the user at a source network side.

Now, the handover is completed.

It should be noted that in the above operation steps of the embodiment, the T-HeNB notifies the T-MME of the tunnel information through the handover notification message of the step 609 by the T-HeNB; alternatively, as another implementation of the present disclosure, the tunnel information may also be carried to the T-MME through the handover acknowledgement message of the step 605, and other subsequent delivery paths are the same as the above steps of the embodiment.

In the above operation steps of the embodiment, the S-GW reports the tunnel information to the PCRF through a gateway control session establishing/modifying message; alternatively, as another implementation of the present disclosure, no matter whether the S-GW relocation occurs or not, the S-GW may send the tunnel information to the P-GW through the PBU message, then the P-GW reports the tunnel information to the PCRF through an IP-CAN session modifying flow, and operations after the PCRF are the same as the above steps of the embodiment.

Figure 7:
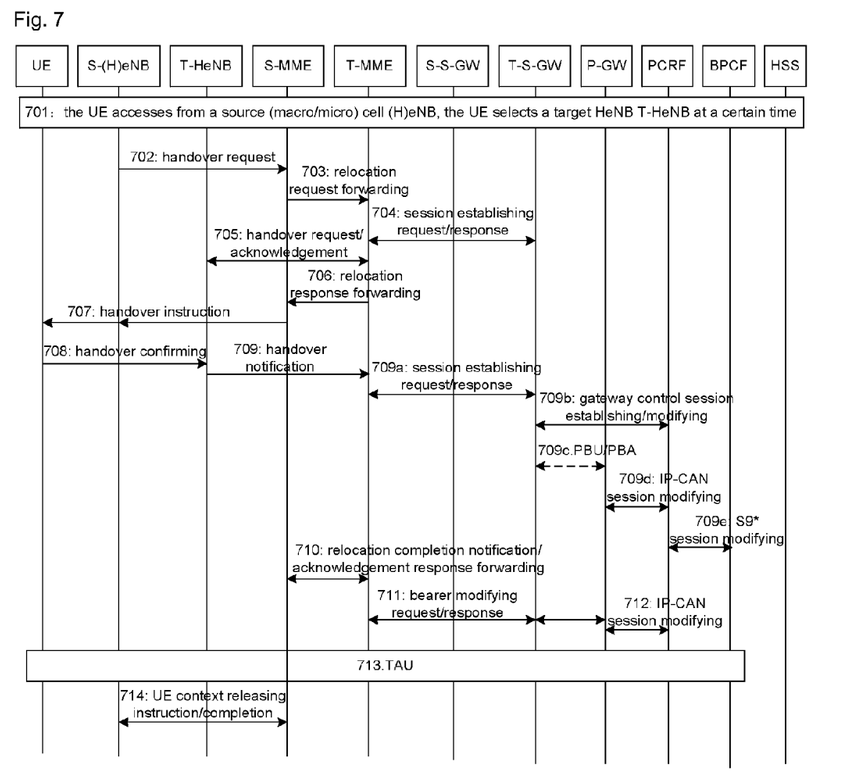
FIG. 7 is a flow chart of a method for updating tunnel information in a fifth embodiment of the present disclosure.

The fifth embodiment of the present disclosure is as shown in FIG. 7, and the mechanism of the embodiment is similar to that of the second embodiment except that instead of a GTP protocol, a PMIP protocol is adopted between S-GW and P-GW, therefore tunnel information is not delivered from the S-GW to the P-GW and then to PCRF, but is reported to the PCRF by the S-GW through the gateway control session, and then reported to BPCF by the PCRF. The following steps are mainly included:

Steps 701-709, are the same as steps 301-309 in the first embodiment.

Step 709a, after receiving the tunnel information sent by T-HeNB through step 705 or 709, T-MME resends a session establishing, modifying or updating request message to T-S-GW and carries the tunnel information to T-S-GW.

Step 709b, T-S-GW initiates a gateway control session establishing/modifying operation with PCRF, and sends the tunnel information to the PCRF.

Step 709c, if S-GW relocation occurs, then binding of S-GW and P-GW is implemented through a PBU/PBA message; if S-GW relocation doesn't occur, then this step is skipped.

Step 709d, the P-GW updates an IP-CAN session with the PCRF.

Step 709e, the PCRF initiates an S9* session establishing/updating operation after receiving the tunnel information; specifically:

when there is no S9* session between the PCRF and the BPCF before the handover, then the PCRF selects the BPCF according to the received tunnel information, initiates the S9* session establishing operation, and sends the tunnel information to the selected BPCF; and when there exists an S9* session between the PCRF and the BPCF before the handover, then the PCRF verifies whether the BPCF having the S9* session between itself and the PCRF is the one indicated by the tunnel information: if so, the PCRF initiates the S9* session modifying operation and sends the tunnel information to the BPCF; otherwise the PCRF re-selects a BPCF according to the tunnel information, initiates the S9* session establishing operation, and sends the tunnel information to the re-selected BPCF.

Operations of steps 710-714 are the same as those of steps 410-414 and will not be repeated here.

It should be noted that in the above operation steps, the S-GW reports the tunnel information to the PCRF through a gateway control session establishing/modifying message; alternatively, as another implementation of the present disclosure, no matter whether the S-GW relocation occurs or not, the S-GW may send the tunnel information to the P-GW through the PBU message, then the P-GW reports the tunnel information to the PCRF through an IP-CAN session modifying flow, and operations after the PCRF are the same as the above steps of the embodiment.

Figure 8:
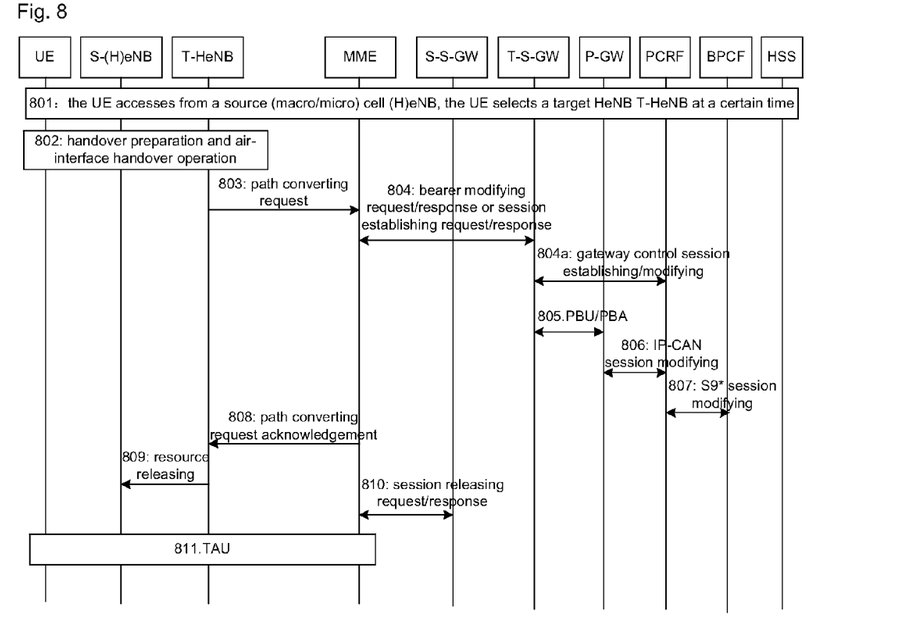
FIG. 8 is a flow chart of a method for updating tunnel information in a sixth embodiment of the present disclosure.

The sixth embodiment of the present disclosure is as shown in FIG. 8, and the mechanism of the embodiment is similar to that of the third embodiment except that instead of a GTP protocol, a PMIP protocol is adopted between S-GW and P-GW, therefore the tunnel information is not delivered from the S-GW to the P-GW and then to PCRF, but is reported to the PCRF by the S-GW through the gateway control session, and then reported to BPCF by the PCRF.

In addition, this embodiment is based on the handover scenario in an X2 interface, wherein a signalling bearing the tunnel information is different from that of the fifth and fourth embodiments. The following steps are mainly included:

Steps 801-804, are the same as steps 501-504 in the third embodiment;

Steps 804a-807, are the same as steps 709b-709e in the fifth embodiment;

Steps 808-811, are the same as steps 508-511 in the third embodiment and will not be repeated here.

Now, the handover is completed.

It should be noted that in the above operation steps of the embodiment, the S-GW reports the tunnel information to the PCRF through a gateway control session establishing/modifying message; alternatively, as another implementation of the present disclosure, no matter whether the S-GW relocation occurs or not, the S-GW may send the tunnel information to the P-GW through the PBU message, then the P-GW reports the tunnel information to the PCRF through an IP-CAN session modifying flow, and operations after the PCRF are the same as the above steps of the embodiment.

Figure 9:
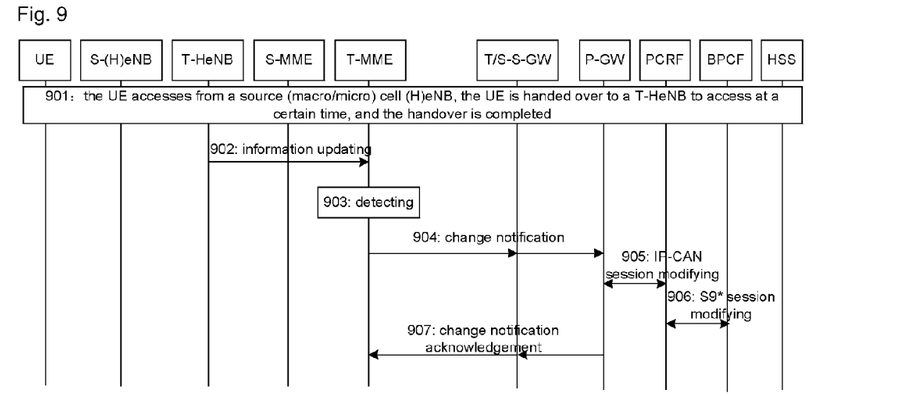
FIG. 9 is a flow chart of a method for updating tunnel information in a seventh embodiment of the present disclosure.

The seventh embodiment of the present disclosure is as shown in FIG. 9, and is different from the aforementioned embodiments, wherein tunnel information is always delivered by extending an existing message in a handover operation; while in this embodiment, the tunnel information is reported to a core network and a WLAN side through a dedicated notification flow, which is described specifically as follows.

Step 901, referring to an existing flow as shown in FIG. 2, a UE is handed from a macro-cell over to a micro-cell or is handed over micro-cells.

Step 902, a T-HeNB updates tunnel information to a T-MME.

Step 903, the T-MME receives the latest tunnel information according to step 902, or receives the latest tunnel information from a handover acknowledgement, path handover request or handover notification message according to the method in the first to the sixth embodiments; if the MME detects that the latest tunnel information is changed, then the MME reports to a core network.

Step 904, the tunnel information is reported by the T-MME to a T-S-GW, and reported by the T-S-GW to a P-GW through a change notification message.

Operation steps of steps 905-906 are the same as those of steps 506-507 and will not be repeated here.

Step 907, the P-GW returns a change notification acknowledgement message to the T-S-GW, which then returns a change notification acknowledgement message to the T-MME.

It should be noted that the steps 902-907 of the embodiment may also be performed simultaneously with the handover operation step 901, without any strict performing order.

To sum up, the method for updating tunnel information provided by the present disclosure may be summarized as follows:

a target HeNB to which a UE is to be handed over notifies an MME of the tunnel information through a handover acknowledgement message, a handover notification message, or a path converting request message; and the MME notifies a fixed network of the received tunnel information through an EPC gateway and a PCRF.

Accordingly, the system for updating tunnel information includes: a target HeNB to which a UE is to be handed over, an MME, an EPC gateway, and a PCRF, wherein, the target HeNB is configured to notify the MME of the tunnel information through a handover acknowledgement message, a handover notification message, or a path converting request message;

the MME is configured to notify a fixed network of the received tunnel information through the EPC gateway and the PCRF; and the EPC gateway and the PCRF are configured to implement forwarding of the tunnel information from the MME to the fixed network.

Wherein, the EPC gateway may include: an S-GW and a P-GW, and accordingly, the MME is further configured to notify the S-GW of the received tunnel information through a session establishing, modifying or updating request message or a bearer modifying request message;

the S-GW is configured to notify the P-GW of the received tunnel information through the session establishing, modifying or updating request message, the bearer modifying request message, or a PBU message;

the P-GW is configured to notify the PCRF of the received tunnel information through an IP-CAN session modifying message; and the PCRF is configured to notify a BPCF of the fixed network of the received tunnel information through an S9* session establishing or modifying operation.

Namely, corresponding to a GTP scenario, the method for updating the tunnel information provided by the present disclosure is specifically:

the target HeNB to which a UE is to be handed over notifies an MME of the tunnel information through a handover acknowledgement message, a handover notification message, or a path converting request message; and the MME notifies an S-GW of the received tunnel information through a session establishing, modifying or updating request message or a bearer modifying request message;

the S-GW notifies a P-GW of the received tunnel information through the session establishing, modifying or updating request message, the bearer modifying request message, or a PBU message; and the P-GW notifies the PCRF of the received tunnel information through an IP-CAN session modifying message; and the PCRF notifies a BPCF of the fixed network of the received tunnel information through an S9* session establishing or modifying operation.

Wherein, the EPC gateway may also include only the S-GW, and accordingly, the MME is further configured to notify the S-GW of the received tunnel information through the session establishing, modifying or updating request message or a bearer modifying request message;

the S-GW is configured to notify the PCRF of the received tunnel information through a gateway control session modifying message; and the PCRF is configured to notify a BPCF of the fixed network of the received tunnel information through an S9* session establishing or modifying operation.

Namely, corresponding to a PMIP scenario, the method for updating the tunnel information provided by the present disclosure is specifically:

a target HeNB to which a UE is to be handed over notifies an MME of the tunnel information through a handover acknowledgement message, a handover notification, message or a path converting request message; and the MME notifies an S-GW of the received tunnel information through a session establishing, modifying or updating request message or a bearer modifying request message;

the S-GW notifies the PCRF of the received tunnel information through a gateway control session modifying message; and the PCRF notifies a BPCF of the received tunnel information through an S9* session establishing or modifying operation.

In addition, when the handover is in an S1 mode, the target HeNB notifies the MME of the tunnel information through the handover acknowledgement message or the handover notification message; and when the handover is in an X2 mode, the target HeNB notifies the MME of the tunnel information through the path converting request message.

The system for updating tunnel information corresponding to the method for updating tunnel information of the embodiment shown in FIG. 9 of the present disclosure includes: a target HeNB to which a UE is to be handed over, an MME, a P-GW, a PCRF, and a BPCF of a fixed network, wherein, the target HeNB is configured to notify the MME of the tunnel information through a handover acknowledgement message, a handover notification message, or a path converting request message;

the MME is configured to notify the P-GW of the received tunnel information through a change notification message;

the P-GW is configured to notify the PCRF of the received tunnel information through an IP-CAN session modifying message;

the PCRF is configured to notify the BPCF of the fixed network of the received tunnel information through an S9* session establishing or modifying operation; and the BPCF is configured to receive the tunnel information notified by the PCRF.

It should be noted that the tunnel information in the embodiments of the present disclosure is an outer layer IP address of the target HeNB; in addition, the tunnel information may also include one kind or several kinds of the following information:

an FQDN of the BPCF;
an outer layer port number of the target HeNB;
an address and/or port number of an SeGW of an IPsec tunnel;
an identity of the target HeNB; and
an ID of a VLAN where the HeNB is located.

To sum up, in the present disclosure, when a UE is handed over (H)eNBs, the target HeNB updates its related tunnel information to the core network, when the UE is handed over micro-cell (H)eNBs, the core network can receive the tunnel information of the target HeNB so as to implement resource control; when the UE is handed from a macro-cell over to a micro-cell, the core network can receive information on the local IP address/port number of the fixed network line where the target HeNB is located so as to implement policy interworking and resource management of the mobile network and the fixed network; with the present disclosure, the QoS of the HeNB is ensured.

What described are merely preferred embodiments of the present disclosure, and are not intended to limit the protection scope of the present disclosure.

The invention claimed is:

1. A method for updating tunnel information, comprising:
receiving, by a Mobility Management Entity (MME), tunnel information from a target Home evolved NodeB (HeNB) to which a User Equipment (UE) is to be handed over through a handover acknowledgement message, a handover notification message, or a path converting request message; and notifying, by the MME, a fixed network of the received tunnel information through an Evolved Packet Core (EPC) gateway and a Policy and Charging Rules Function entity (PCRF), when there is no S9* session between the PCRF and a BPCF before the handover, the PCRF selects a BPCF according to the received tunnel information, initiates an S9* session establishing operation, and sends the tunnel information to the selected BPCF; and when there exists an S9* session between the PCRF and a BPCF before the handover, the PCRF verifies whether the BPCF having the S9* session between itself and the PCRF is the one indicated by the tunnel information: if so, the PCRF initiates an S9* session modifying operation, and sends the tunnel information to the BPCF; otherwise the PCRF re-selects a BPCF according to the tunnel information, initiates the S9* session establishing operation, and sends the tunnel information to the re-selected BPCF.

2. The method for updating tunnel information according to claim 1, wherein the notifying, by the MME, a fixed network of the received tunnel information through an EPC gateway and a PCRF is:
notifying, by the MME, a Serving Gateway (S-GW) of the received tunnel information through a session establishing, modifying or updating request message or a bearer modifying request message;

notifying, by the S-GW, a Packet Data Network Gateway (P-GW) of the received tunnel information through a session establishing, modifying or updating request message, a bearer modifying request message, or a Proxy Binding Update (PBU) message; and notifying, by the P-GW, the PCRF of the received tunnel information through an IP Connectivity Access Network (IP-CAN) session modifying message, such that the PCRF notifies a Broadband Policy Control Function entity (BPCF) of the fixed network of the received tunnel information through an S9* session establishing or modifying operation.

3. The method for updating tunnel information according to claim 1, wherein the notifying, by the MME, a fixed network of the received tunnel information through an EPC gateway and a PCRF is:

notifying, by the MME, a Serving Gateway (S-GW) of the received tunnel information through a session establishing, modifying or updating request message or a bearer modifying request message; and notifying, by the S-GW, the PCRF of the received tunnel information through a gateway control session modifying message, such that the PCRF notifies a Broadband Policy Control Function entity (BPCF) of the fixed network of the received tunnel information through an S9* session establishing or modifying operation.

4. The method for updating tunnel information according to claim 1, wherein the notifying, by the MME, a fixed network of the received tunnel information through an EPC gateway and a PCRF is:

notifying, by the MME, a Packet Data Network Gateway (P-GW) of the received tunnel information through a change notification message through a Serving Gateway (S-GW); and notifying, by the P-GW, the PCRF of the received tunnel information through an IP Connectivity Access Network (IP-CAN) session modifying message, such that the PCRF notifies a Broadband Policy Control Function entity (BPCF) of the fixed network of the received tunnel information through an S9* session establishing or modifying operation.

5. The method for updating tunnel information according to claim 1, wherein when the handover is in an S1 mode, receiving, by the MME, the tunnel information from the target HeNB through the handover acknowledgement message or the handover notification message; or wherein when the handover is in an X2 mode, receiving, by the MME, the tunnel information from the target HeNB through the path converting request message.

6. The method for updating tunnel information according to claim 1, wherein the tunnel information comprises an outer layer IP address of the target HeNB.

7. The method for updating tunnel information according to claim 6, wherein the tunnel information further comprises one kind or several kinds of the following information:

a Fully Qualified Domain Name (FQDN) of a BPCF;
an outer layer port number of the target HeNB;
an address and/or port number of a Security Gateway (SeGW) of an IP Security (IPsec) tunnel;
an identity of the target HeNB; and
an Identity (VLAN ID) of a Virtual Local Area Network where the target HeNB is located.

8. A system for updating tunnel information, comprising a Mobility Management Entity (MME) node and an Evolved Packet Core (EPC) gateway, wherein the MME node receives tunnel information from a target Home evolved NodeB (HeNB) to which a User Equipment (UE) is to be handed over through a handover acknowledgement message, a handover notification message, or a path converting request message, and notifies a fixed network of the received tunnel information through the EPC gateway and a Policy and Charging Rules Function entity (PCRF); and wherein the EPC gateway forwards the tunnel information from the MME node to the fixed network through the PCRF, wherein when there is no S9* session between the PCRF and a BPCF before the handover, the PCRF selects a BPCF according to the received tunnel information, initiates an S9* session establishing operation, and sends the tunnel information to the selected BPCF; and wherein when there exists an S9* session between the PCRF and a BPCF before the handover, the PCRF verifies whether the BPCF having the S9* session between itself and the PCRF is the one indicated by the tunnel information: if so, the PCRF initiates an S9* session modifying operation, and sends the tunnel information to the BPCF; otherwise the PCRF re-selects a BPCF according to the tunnel information, initiates the S9* session establishing operation, and sends the tunnel information to the re-selected BPCF.

9. The system for updating tunnel information according to claim 8, wherein the EPC gateway comprises: a Serving Gateway (S-GW) and a Packet Data Network Gateway (P-GW), wherein the MME node notifies the S-GW of the received tunnel information through a session establishing, modifying or updating request message or a bearer modifying request message;

wherein the S-GW notifies the P-GW of the received tunnel information through a session establishing, modifying or updating request message, a bearer modifying request message, or a Proxy Binding Update (PBU) message; and wherein the P-GW notifies the PCRF of the received tunnel information through an IP Connectivity Access Network (IP-CAN) session modifying message, such that the PCRF notifies a Broadband Policy Control Function entity (BPCF) of the fixed network of the received tunnel information through an S9* session establishing or modifying operation.

10. The system for updating tunnel information according to claim 8, wherein the EPC gateway comprises: a Serving Gateway (S-GW), wherein the MME node notifies the S-GW of the received tunnel information through a session establishing, modifying or updating request message or a bearer modifying request message; and wherein the S-GW notifies the PCRF of the received tunnel information through a gateway control session modifying message, such that the PCRF notifies a Broadband Policy Control Function entity (BPCF) of the fixed network of the received tunnel information through an S9* session establishing or modifying operation.

11. The system for updating tunnel information according to claim 8, wherein the EPC gateway comprises: a Serving Gateway (S-GW) and a Packet Data Network Gateway (P-GW), wherein the MME node notifies the P-GW of the received tunnel information through a change notification message through the S-GW; and the P-GW notifies the PCRF of the received tunnel information through an IP Connectivity Access Network (IP-CAN) session modifying message, such that the PCRF notifies a Broadband Policy Control Function entity (BPCF) of the fixed network of the received tunnel information through an S9* session establishing or modifying operation.

12. The system for updating tunnel information according to claim 8, wherein the MME node receives the tunnel information from the target HeNB through the handover acknowledgement message or the handover notification message when the handover is in an S1 mode; or receives the tunnel information from the target HeNB through the path converting request message when the handover is in an X2 mode.

13. The system for updating tunnel information according to claim 8, wherein the tunnel information comprises an outer layer IP address of the target HeNB.

14. The system for updating tunnel information according to claim 13, wherein the tunnel information further comprises one kind or several kinds of the following information:

a Fully Qualified Domain Name (FQDN) of a BPCF;

an outer layer port number of the target HeNB;

an address and/or port number of a Security Gateway (SeGW) of an IP Security (IPsec) tunnel;

an identity of the target HeNB; and an Identity (VLAN ID) of a Virtual Local Area Network where the target HeNB is located.

* * * * *